June 25, 1929.   J. ARTER   1,718,846
FRICTION BALL GEARING
Filed Oct. 29, 1928   2 Sheets-Sheet 1
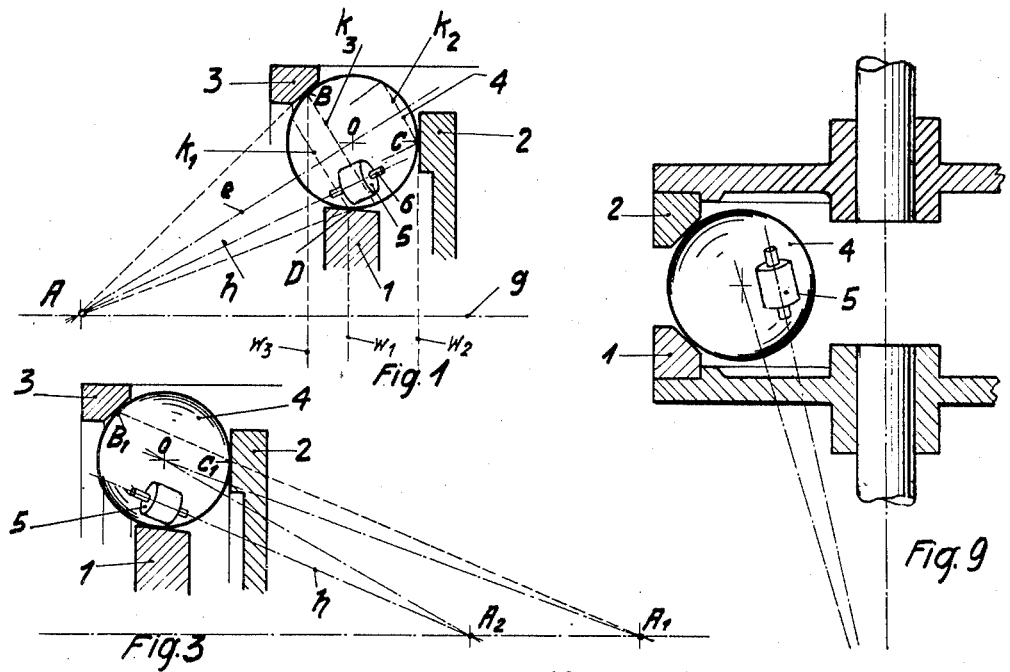
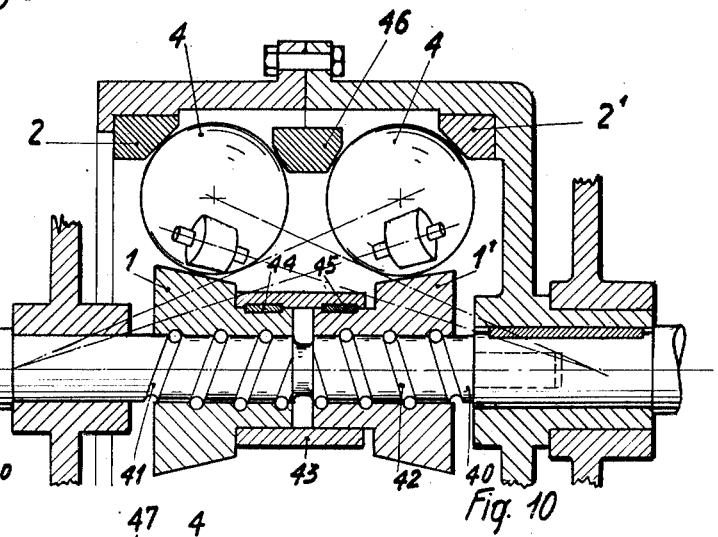
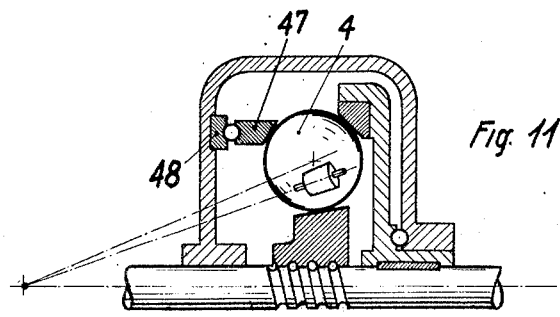
Inventor
Jakob Arter

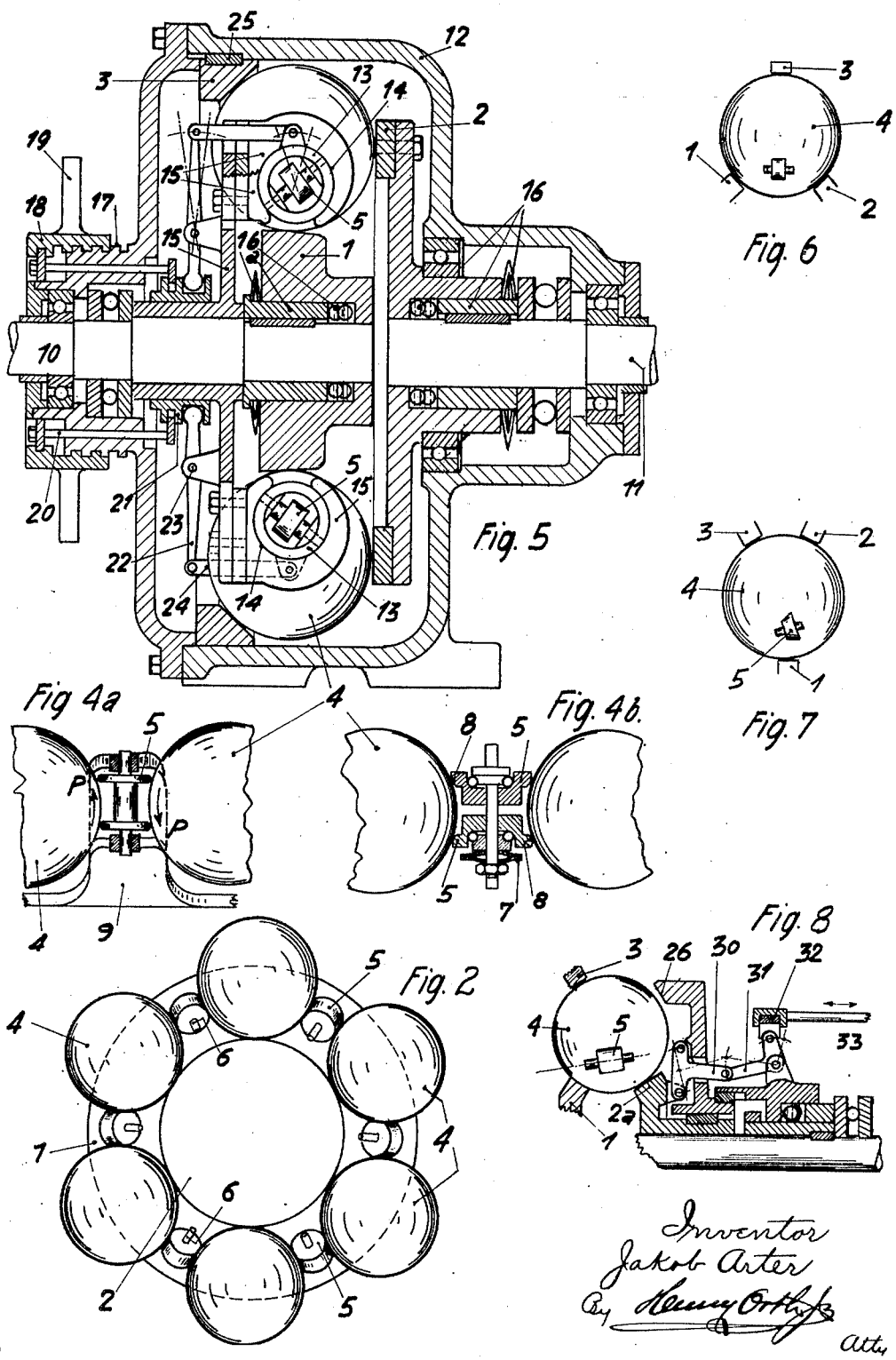

Patented June 25, 1929.

1,718,846

UNITED STATES PATENT OFFICE.

JAKOB ARTER, OF OBER-ENGSTRINGEN, SWITZERLAND.

FRICTION BALL GEARING.

Application filed October 29, 1928, Serial No. 315,758, and in Switzerland November 18, 1927.

The subject matter of the present invention is a friction gear in which balls, rolling over at least two races, transmit power from a driving to a driven shaft, the ratio of speed of the gear being determined by the angle between the individual axis of rotation of the balls themselves and the main axis of rotation of the gearing. According to the present invention this angle is determined by auxiliary rolling members each of which is forced against two adjacent balls with a pressure such that any slip between the balls and the auxiliary rolling members during the transmission of power is rendered impossible and the balls, at their points of contact with the auxiliary rolling members are compelled, by the frictional forces set up, to follow the movements of the auxiliary rolling members. A gear of this kind has the advantage that using ordinary commercial balls it may be constructed in the same general form for various different ratios of speed it being only necessary to change the direction of the axis of rotation of the auxiliary rolling members in order to adapt the gear to the particular ratio of speed desired. This possibility of easily determining the ratio of speed has been found to be particularly advantageous when the gear is to be used as a change speed gear, since by rocking the axis of rotation of the auxiliary rolling member, which can be very easily effected and in no way disturbs the transmission of power the ratio of speed can be conveniently varied while the apparatus is in motion, without the transmission devices having to be moved out of their relative positions and without forces due to contact pressure having also to be overcome. Moreover, the limits within which the ratio of speed may be varied are very great. As the balls always revolve about fresh axes when the ratio of speed is changed the advantage of uniformly distributed wear and tear on the external surfaces of the balls is also secured.

It is true that in friction ball gears for invariable ratios of speed in which the balls are arranged between a driving, a driven and a stationary race, it is already known to provide auxiliary rolling members. In these friction ball gears, however, the auxiliary rolling members have merely had to act as carriers or drivers; consequently there has been no provision for exerting pressure as between the balls and the auxiliary rolling members apart from the unidirectional force which is transmitted to the shaft to be driven. Thus, between the balls and auxiliary rolling members, in front of each ball having regard to its direction of motion there is only loose contact or a space. Gears of this kind, however, can only run satisfactorily if the three points of contact of the ball, that is to say, its points of contact with the driving race, the stationary race and an auxiliary rolling member lie in the same plane of cross-section of the ball, and when furthermore the own axis of rotation of the ball is at right angles to the plane of this cross-section. If the above condition respecting the position of the points of contact be not fulfilled, that is to say, if the point of contact of the auxiliary rolling member projects in the direction of transmission of the force for a certain distance beyond the line which joins the two points of contact of the particular ball with the races, the force of transmission acting at the point of contact between the ball and the auxiliary rolling member forms, with this distance as a lever arm, a moment, which tends so to rotate the ball that the latter evades the performance of work. Whereas in the friction ball gears with auxiliary rolling members it is necessary, for preventing evasive rotation of the balls, to employ a certain arrangement of the points of contact in order that the above mentioned lever arm is not present, such a lever arm and the moment associated therewith has no prejudicial effect whatever on the gear according to the present invention and consequently the arrangement of the points of contact between the balls and the races may be freely selected. In this arrangement the balls and the auxiliary rolling members are pressed together with such force, in both directions, that the aforesaid moment is not able, of itself, to rotate the balls, inasmuch as the resistance, due to friction, between both members acts in opposition to this rotation and also guides the balls in such a way that they can only follow the movements of the auxiliary rolling member in a definite manner, that is to say, can only rotate each about a determinate own axis of rotation. Any such own axis of rotation, however, may be variously directed in a plane passing through the axis of the gear and the centre of the ball, only the direction thereof is always dependent upon the direction imparted to the axes of the auxiliary rolling members themselves. Thus the auxiliary rolling members in the friction gear according to this invention perform a different function from those of the friction ball gears of the well known type of construction hereinbefore referred to, the known gears only allowing changes to be made in the ratio of speed by the interchange of certain parts, while the ratio of speed can be varied as may be desired in the new gear without any of the components thereof having to be interchanged.

Various constructional forms of the subject matter of the invention are illustrated, by way of example, in the accompanying drawings in which:

Figs. 1 and 2 show diagrammatically an axial section and a side elevation, respectively, of a first constructional form, which serves simultaneously for the explanation of the principle on which the invention is based.

Fig. 3 shows the same axial section as in Fig. 1, but with other axis of rotation for the balls and auxiliary rolling members.

Figs. 4ª and 4ᵇ show two further developments of the auxiliary rolling members.

Fig. 5 shows in a more constructive axial section a form of the friction gear adapted for variable ratios of speed, while Figs. 6 and 7 show diagrammatically further constructions of details.

Fig. 8 shows an arrangement in which the driven member is provided with two races.

Fig. 9 shows a construction with only two races.

Fig. 10 shows a similar arrangement with two rings of balls, and

Fig. 11 shows a modification of the arrangement illustrated in Fig. 10.

In the diagrammatic view according to Figs. 1 and 2 the numeral 1 denotes a driving element, the numeral 2 a driven element and the numeral 3 a stationary element, which latter may be rigidly connected to a gear casing (not shown). All three parts 1, 2 and 3 are arranged co-axially and provided in each case with a race on which balls 4 roll. Between the balls 4 are provided auxiliary rolling members 5, each of which is in frictional contact with two adjacent balls 4 (Fig. 2). The pressures acting at the points of contact between the balls 4 and the rolling members 5 on both sides of the said bodies must be so great that any slip between the balls and the rolling members during the transmission of power is precluded and all the balls and the auxiliary rolling members form together during the movement a closed system. The auxiliary rolling members 5 are provided with supporting axles, which in Figs. 1 and 2 are indicated merely by pins 6.

In Fig. 1 the own axis of rotation $h$ of the auxiliary rolling member 5 cuts the axis $g$ of the gearing at an acute angle at A. If the auxiliary rolling member rotates about its own axis $h$ whilst it revolves at the same time around the axis $g$ of the gear, the balls 4 in contact with it must also rotate in such a way that the elements of the paths of the balls 4 and the auxiliary rolling member 5 are similarly directed at the points of contact. The same thing applies to the elements of the paths of the movement at the points of contact of the balls 4 with the members 1, 2 and 3. This condition can however only be fulfilled for all points of contact, the number of which amounts to four, at the least for each ball, (under some circumstances the auxiliary member may be made in several parts) when all the elements of the paths belong to circles whereof the central axis normal to the plane of the circle, passes through the point A. All the contact circles $k_1, k_2, k_3$ lying on the ball 4 then have a common centre axis, which, at the same time, forms the own axis of rotation $e$ of the ball 4. The circles of contact $w_1, w_2, w_3$ which apply to the parts, 1, 2 and 3 have likewise a common centre axis which coincides with the axis $g$ of the gear. If superficies of cones be assumed to be erected over the several contact circles $k_1, k_2, k_3, w_1, w_2, w_3$ the points thereof lying in each case at A, the cones corresponding to the ball 4 roll, during the movement taken into consideration, that is to say, during the rotation of the auxiliary rolling members 5 around the axis $g$ and $h$, on the cones which correspond to the parts 1, 2 and 3. If however a different inclination be given to the axis $h$ of the auxiliary rolling member 5, a different point of intersection between it and the axis $g$ of the gear will arise. The ball 4 must then likewise vary its own axis of rotation $e$.

In the illustration shown in Fig. 1 the ball 4 rolls with the cone indicated by the generating line A B on the cone of the stationary part 3 generated by the same line. Were the points of contact of the ball 4 with the part 1 and the part 2 to lie on the same cone generating line passing through A, the parts 1 and 2 would have the same angular velocity. As however the generating line A C forms with the line A B a smaller angle than the generating line A D, the angular velocity of the part 2 is smaller than that of the part 1. There is a reduction of speed or gearing down effect if 1 be the driving member and 2 the driven member.

If on the other hand the angle which the generating line A C forms with the generating line A B were to be greater than the angle which the generating line A D forms with the generating line A B, there would be an increase of speed, or gearing up effect, assuming 1 to be the driving member and 2 the driven member.

In Fig. 3 is shown an axis O A₁ for the ball 4, for which the cone generating line C₁ and A₁ starting from the driven part 2 coincides with the cone generating line B₁ A₁ starting from the stationary part 3. The part 2, consequently, has the same angular velocity imparted to it as the part 3, that is to say, it remains stationary. If by further rocking of the axis $h$ of the auxiliary rolling member 5 the axis of rotation of the ball be rotated as far as the point of intersection $A_2$, the parts 1 and 2 rotate in opposite directions. By rocking the axis $h$ of the auxiliary rolling member 5 the speed of rotation of the driven part 2 can, therefore, be varied in the most convenient manner possible within wide limits, which properly makes the gear particularly suitable for use as a change speed gear.

The auxiliary rolling members 5 may also be of different construction from that shown in Figs. 1 to 3 Thus, for example, they may be shaped in the manner shown in Fig. 4$^a$, in such a way that they touch each of the adjacent balls 4 at more than one point or have more than one track or race rolling thereon. In this construction the tilting moment which is exerted during the transmission of the power by the balls 4 to the auxiliary rolling members 5 and indicated by arrows P, and also the axial pressures are directly absorbed by the parts 4, 5 rolling on each other, so that the bearings of the shafts or spindles of the auxiliary rolling member 5 are relieved of such stresses.

The auxiliary rolling members may also be constructed as shown in Fig. 4$^b$, wherein the various tracks or races 8 of the auxiliary rolling member 5 along which the latter makes contact with the balls 4 are movable axially in relation to each other and are pressed towards each other and against the balls 4 by springs 7, whereby the necessary frictional resistances can be produced at the points of contact with the balls.

The auxiliary rolling members 5 must be mounted in a rotatable member 9 which revolves at the same angular velocity as the balls 4, shown in Fig. 4$^a$, and more fully described hereinafter with reference to Fig. 5. In a gear with a fixed ratio of speed the mounting may be an immovable one, whereas in the case of a variable ratio of speed it must be one which can be rotated, so that the axis of the auxiliary rolling member can be rocked in its longitudinal direction.

Fig. 5 shows in a more practical form the construction of a gearing which allows of variable adjustment of the ratio of speed. Here, again, 1 denotes the driving member of the gearing, which is rotated by a driving shaft 10, while 2 is the driven member, which transmits its movement to the driven shaft 11, and 3 is the stationary element which is prevented from rotating by keys 25 which project into the casing 12 of the gear. The balls 4, which are arranged between the parts 1, 2 and 3, serve for the transmission of the power. Each auxiliary rolling member 5 is, in this case, mounted in a hollow cylinder 13 which, in its turn, is arranged to rotate in a cylindrical hollow chamber 14 in a revolving member 15 mounted loosely on the driving shaft 10. The parts 1, 2, 3 and 4 are pressed against each other by automatically acting devices 16 and 16$^a$ having balls and springs. The resultant of the pressures exerted by the tracks or races of the parts 1, 2, 3 on the balls 4 is directed inwards and therefore presses the balls 4 against the auxiliary rolling members 5, lying between them so that no special device has to be provided for pressing the said rolling members against the balls. The revolving member 15, the balls 4 and the auxiliary rolling members 5 all rotate at the same angular velocity around the axis of the gear. In order to enable the ratio of speed to be varied, there is provided on one end of the casing 12 which terminates in a boss, a screw thread 17, on which rides a nut 18 which can be adjusted by means of a handle 19. The axial movements of the nut 18 are transmitted by rods 20 to a sleeve 21, which is mounted to move longitudinally on the revolving member 15. One end of two-armed levers 22, which are pivoted at 23 to the revolving member 15, engage in an annular groove in the sleeve 21 and at their other ends said levers are each pivoted to a rod 24. Each of these rods 24 is also pivoted to a hollow cylinder 13. When the nut 18 is rotated the regulating sleeve 21 is moved endways, which produces rotation of the levers 22 whereby the hollow cylinders 13 are rotated also. This results in a shifting of the own axis of rotation of the auxiliary rolling member 5 and thereby also in a rotation of the balls 4 around another own axis of rotation, so that the ratio of speed is changed.

Instead of the parts 1, 2, 3 being arranged with respect to the balls 4, as shown in Figs. 1 to 5, they may be arranged as shown in Figs. 6 and 7. Fig. 7 also shows an arrangement wherein the auxiliary rolling members are not cylindrical but of conical shape.

In the arrangement shown in Fig. 8 the driven part has two races 2$^a$, 2$^b$, which, by a system of levers 30, 31, a ring 32 and a rod 33 can be selectively brought into contact with the balls 4. This arrangement even in the case of a wide range of adjustment affords the possibility of providing, for all ratios of speed, rolling circles for the balls which give a good torque and, in particular, it is possible to avoid that point where the own axis of rotation of the balls 4 passes through the point of contact of a race. If desired the driving part 1 or the non-rotating part 3 may also be provided with races which are designed to be brought into contact selectively.

In all the constructional forms hitherto described the balls 4 are, in each case, arranged between a driving element 1, a driven element 2 and a stationary element 3. The angle between the own axis of rotation $e$ of the balls 4 and the main axis of rotation $g$ of the gear can however already be determined by the auxiliary rolling members 5 when the balls 4 are arranged only between a driving and a driven element, that is to say, in the case also where there is no stationary element 3. A constructional form of this kind is shown in Fig. 9, wherein only two races are present, of which one belongs to the driving member 1 and the other to the driven member 2. As there is no stationary race present, the member (not shown) in which the auxiliary rolling members 5 are journalled must be stationary, that is to say, it must not be arranged to rotate. The axes of the auxiliary rolling members 5 and those of the balls 4 then remain stationary. The balls 4 cannot escape from their position, any inward movement of each ball 4 being prevented by the two auxiliary rolling members 5 in contact with it, while outwardly and axially it is retained by the two races 1 and 2.

Fig. 10 shows a similar example, which is like the one described in that it has no stationary race but in which, however, two rings of balls 4 are employed. 1 denotes in this case the driving member of the left hand half of the gear and $1^1$ that of the right hand half, 2 and $2^1$ in each case being the driven members of the two halves. Each driving member 1 or $1^1$ is mounted on a ball-containing screw thread 41 or 42 on the driving shaft 40, the pitches of these ball threads being opposed to each other, so that the torque forces the two parts 1 and $1^1$ axially together and consequently towards the balls 4, so that the friction necessary for transmission is set up. The sleeve 43 with its keys 44, 45 rigidly connected to the driving members 1 and $1^1$ ensures that the driving members of both halves of the gearing can only rotate together, so that axial movement of the shaft 40 is avoided. As the illustrated arrangement of the races of the parts 1 and 2 or $1^1$ and $2^1$ cannot prevent escape of the balls 4 an auxiliary ring 46 is provided between the two rings of balls. This ring assists in guiding of the balls 4 and also takes up the forces of contact pressure. By this symmetrical double arrangement the axial pressures on the two halves of gear can be made to balance each other completely, both on the driving and also on the driven side, so that no thrust bearings are necessary, and furthermore, owing to the greater number of balls, a greater amount of power can be transmitted with a gear of the same diameter than in the case of a single arrangement, Again, by using the auxiliary ring 46 the position of the races 1 and 2 or $1^1$ and $2^1$ respectively can be selected with a greater degree of freedom than in the example shown in Fig. 8. To achieve this purpose, as shown in Fig. 11, an auxiliary ring 47 may also be used in gear with only one ring of balls 4, only it must then be separately journalled as shown at 48.

In addition to the examples described, the arrangement may also be so contrived that the part which carries the auxiliary rolling member becomes the driving or the driven member of the gear.

I claim:

1. A friction gear, comprising in combination, a driving shaft, a driven shaft, a plurality of balls, at least two races on which said balls roll, one of said races being operatively connected to said driving shaft and another to said driven shaft, auxiliary rolling members adapted to determine the ratio of speed of the gear by influencing the angle between the own axis of rotation of the balls and the main axis of rotation of the gearing, and means to press each of said auxiliary rolling members against two adjacent balls with such a force that any slip between the balls and the auxiliary rolling members during transmission of power is rendered impossible and the balls, at their points of contact with the auxiliary rolling members, are compelled by frictional forces to follow the movement of such auxiliary rolling members.

2. A friction gear, comprising in combination, a driving shaft, a driven shaft, a plurality of balls, at least two races on which said balls roll, one of said races being operatively connected to said driving shaft and another to said driven shaft, auxiliary rolling members adapted to determine the ratio of speed of the gear by influencing the angle between the own axis of rotation of the balls and the main axis of rotation of the gear, each of said auxiliary rolling members being pressed against two adjacent balls with such a force that any slip between the balls and the auxiliary rolling members during transmission of power is rendered impossible and the balls, at their points of contact with the auxiliary rolling members, are compelled by frictional forces to follow the movement of such auxiliary rolling members, said auxiliary rolling members being so arranged that their own axes of rotation are tiltable for obtaining a change in the ratio of speed.

3. A friction gear, comprising in combination, a driving shaft, a driven shaft, a plurality of balls, at least two races on which said balls roll, one of said races being operatively connected to said driving shaft and another to said driven shaft, auxiliary rolling members adapted to determine the ratio of speed of the gear by influencing the angle between the own axis of rotation of the balls and the main axis of rotation of the gear, each of said auxiliary rolling members being pressed against two adjacent balls with such a force that any slip between the balls and the auxiliary rolling members during transmission of power is rendered impossible and the balls, at their points of contact with the auxiliary rolling members, are compelled by frictional forces to follow the movement of such auxiliary rolling members, said auxiliary rolling members being provided with more than one race to roll on the same ball and said auxiliary rolling members being so arranged that their own axes of rotation are tiltable for obtaining a change in the ratio of speed.

4. A friction gear, comprising in combination, a driving shaft, a driven shaft, a plurality of balls, at least two races on which said balls roll, one of said races being operatively connected to said driving shaft and another to said driven shaft, auxiliary rolling members adapted to determine the ratio of speed of the gear by influencing the angle between the own axis of rotation of the balls and the main axis of rotation of the gear, each of said auxiliary rolling members being pressed against two adjacent balls with such a force that any slip between the balls and the auxiliary rolling members during transmission of power is rendered impossible and the balls, at their points of contact with the auxiliary rolling members, are compelled by frictional forces to follow the movement of such auxiliary rolling members, said auxiliary rolling members running in axle journals and being provided with more than one race to roll on the same ball and said various races being so arranged relatively to each other that the axial pressures and tilting moments exerted when power is transmitted to the auxiliary rolling members are directly absorbed by the parts which roll on each other so that the axle journals of the auxiliary rolling members are relieved thereof.

5. A gear, comprising in combination, a driving shaft, a driven shaft, a plurality of balls, at least two races on which said balls roll, one of said races being operatively connected to said driving shaft and another to said driven shaft, auxiliary rolling members adapted to determine the ratio of speed of the gear by influencing the angle between the own axis of rotation of the balls and the main axis of rotation of the gear, each of said auxiliary rolling members being pressed against two adjacent balls with such a force that any slip between the balls and the auxiliary rolling members during transmission of power is rendered impossible and the balls, at their points of contact with the auxiliary rolling members, are compelled by frictional forces to follow the movement of such auxiliary rolling members, said auxiliary rolling members running in axle journals and being provided with more than one race to roll on the same ball, the races of each auxiliary rolling member being movable axially relatively to each other, and springs being provided for pressing together said races and producing the necessary pressures and/or frictional resistances at the points of contact with the balls, the axial pressures and tilting moments exerted when power is transmitted to the auxiliary rolling members are directly absorbed by the parts which roll on each other so that the axle journals of the auxiliary rolling members are relieved thereof.

6. A friction gear, comprising in combination, a driving shaft, a driven shaft, a plurality of balls, at least two races on which said balls roll, one of said races being operatively connected to said driving shaft and another to said driven shaft, auxiliary rolling members adapted to determine the ratio of speed of the gear by influencing the angle between the own axis of rotation of the balls and the main axis of rotation of the gear, each of said auxiliary rolling members being pressed against two adjacent balls with such a force that any slip between the balls and the auxiliary rolling members during transmission of power is rendered impossible and the balls, at their points of contact with the auxiliary rolling members, are compelled by frictional forces to follow the movement of such auxiliary rolling members, said auxiliary rolling members running in axle journals and being provided with more than one race to roll on the same ball and said various races being so arranged relatively to each other that the axial pressures and tilting moments exerted when power is transmitted to the auxiliary rolling members are directly absorbed by the parts which roll on each other so that the axle journals of the auxiliary rolling members are relieved thereof, the resultant of the forces with which the balls are pressed against the races at the points where they are in contact therewith simultaneously furnishing the necessary contact pressure for the auxiliary rolling members.

7. In a friction gearing, a rotary driving member, a rotary driven member, a plurality of balls engaging both members, auxiliary members interposed between the balls, and means to press each auxiliary rolling member against two adjacent balls with such force that any slip between the balls and rolling members during transmission of power is prevented whereby the balls follow the movement of the rolling members.

8. In a friction gearing, a rotary driving member, a rotary driven member, a plurality of balls engaging both members, auxiliary members interposed between the balls, means to press each auxiliary rolling member against two adjacent balls with such force that any slip between the balls and rolling members during transmission of power is prevented, whereby the balls follow the movement of the rolling members, and means to shift the rolling members to change their own axis of rotation for obtaining a change in the ratio of speed of the driving and driven members.

9. In a friction gearing, a rotary driving member, a rotary driven member, a plurality of balls bearing on the driving and driven members, auxiliary rolling members adapted to determine the ratio of speed of the driving and driven members, means to change the axes of rotation of the rolling members to change the angle to the axis of rotation of the balls and to the axis of rotation of the driving and driven members, each of said auxiliary rolling members being pressed against two adjacent balls with sufficient force to prevent relative movement during transmission of power.

In testimony whereof I have signed my name to this specification.

JAKOB ARTER.